(12) United States Patent
Segawa et al.

(10) Patent No.: US 7,085,640 B2
(45) Date of Patent: Aug. 1, 2006

(54) LOCKUP CONTROL OF TORQUE CONVERTER

(75) Inventors: Satoshi Segawa, Atsugi (JP); Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 148 days.

(21) Appl. No.: 10/953,381

(22) Filed: Sep. 30, 2004

(65) Prior Publication Data
US 2005/0121277 A1  Jun. 9, 2005

(30) Foreign Application Priority Data
Dec. 5, 2003 (JP) .............................. 2003-407800

(51) Int. Cl.
*F16H 61/14* (2006.01)

(52) U.S. Cl. ............................ 701/67; 192/3.3; 477/62; 477/169

(58) Field of Classification Search ...................... None
See application file for complete search history.

(56) References Cited

U.S. PATENT DOCUMENTS 4,957,194 A   9/1990 Sawa et al.
5,733,223 A * 3/1998 Matsubara et al. .......... 477/169
5,749,061 A * 5/1998 Kono et al. .................... 701/67
6,066,072 A   5/2000 Adachi
2002/0052265 A1* 5/2002 Segawa et al. ............... 477/62
2004/0082434 A1* 4/2004 Segawa et al. ............... 477/62
2004/0162184 A1* 8/2004 Segawa et al. ............... 477/62

FOREIGN PATENT DOCUMENTS

EP    1 201 971 A2   5/2002

* cited by examiner

*Primary Examiner*—Rodney H. Bonck
(74) *Attorney, Agent, or Firm*—Foley & Lardner LLP

(57) ABSTRACT

A tightening force of a lockup clutch (2) exerted between a pump impeller (1a) connected to an engine (21) and a turbine runner (1b) connected to an automatic transmission (23) is controlled by a controller (5). The controller (5) determines a target relative rotation speed of the pump impeller (1a) and the turbine runner (1b), and performs feedback control of the tightening force such that the difference between the target relative rotation speed and the real relative rotation speed is decreased. The controller (5) also performs feedforward control of the tightening force. When the variation of the relative rotation speed due to the feedforward control has exceeded the predetermined value, the controller (5) corrects the feedback control amount to moderate the effect of the variation, thereby suppressing sudden change in the tightening force.

9 Claims, 12 Drawing Sheets

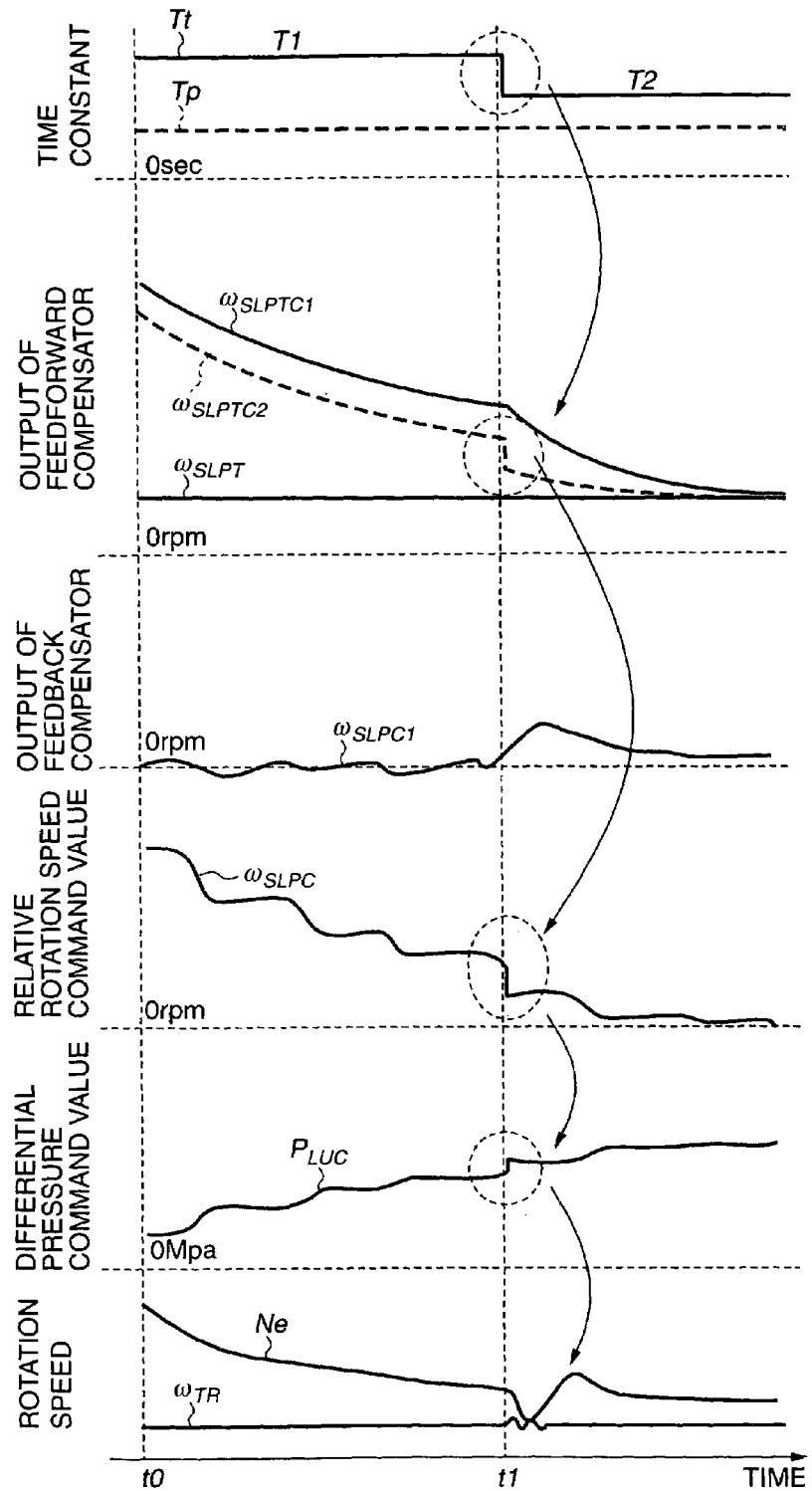

LOCKUP CONTROL OF TORQUE CONVERTER

FIELD OF THE INVENTION

This invention relates to control of a tightening force of a lockup clutch associated with a torque converter for a vehicle.

BACKGROUND OF THE INVENTION

A torque converter installed between an engine and an automatic transmission of a vehicle transmits torque between a pump impeller and a turbine runner via a fluid. Since the relative rotation between the pump impeller and the turbine runner increases the fuel consumption of the engine, it is preferable to directly connect the pump impeller and the turbine runner soon after the vehicle is started up. A lockup clutch is provided to accomplish this purpose.

In a torque converter provided with a lockup clutch, switching between a converter mode in which the torque is transmitted via a fluid and a lockup mode in which the torque is transmitted via the lockup clutch is performed via a slip mode in which a slip in the lockup clutch is allowed such that a part of the torque is transmitted via the fluid while the other part of the torque is transmitted via the lockup clutch.

SUMMARY OF THE INVENTION

With respect to control of a relative rotation speed between the pump impeller and the turbine runner in the slip mode, U.S. Pat. No. 6,066,072 discloses a two-degree-of-freedom control device which determines a relative rotation speed command value between the pump impeller and the turbine runner by using a feedforward command value based on a reference model thereof and a feedback command value based on a difference between the target relative rotation speed and the real relative rotation speed. The device is provided with a feedback compensator and a pre-processing unit comprising a feedforward compensator so as to realize a dynamic characteristic of a reference model.

Herein, the feedback compensator ensures control stability while the feedforward compensator ensures good control response. These compensators can be designed independently of each other.

The target relative rotation speed and the characteristic of the reference model are set according to the required specifications determined during the design stage of the vehicle according to assumed running states of the vehicle. For example, when the vehicle running speed is very low, it is preferable to converge the relative rotation speed promptly to the target relative rotation speed to prevent a muffled sound from being transmitted to the vehicle interior. On the other hand, at a timing immediately after the start of tightening operation of the lockup clutch for shifting from the converter mode to the lockup mode, it is preferable to converge the relative rotation speed smoothly to the target relative rotation speed such that the driver of the vehicle does not notice the lockup action.

The control device according to the prior art satisfies the different requirements by varying a filter constant of the reference model. For example, when the pre-processing unit is provided with a reference model of a first-order delay, it is accomplished by varying the time constant for the first-order delay.

The relative rotation speed between the pump impeller and the turbine runner is controlled through control of the hydraulic pressure applied to the lockup clutch as tightening force.

When the time constant for the first-order delay varies, therefore, hydraulic pressure applied to the lockup clutch also varies. If the time constant for the first-order delay varies abruptly, the hydraulic pressure applied to the lockup clutch varies abruptly, which may cause the lockup clutch to generate a shock.

It is therefore an object of this invention to suppress a shock that may be generated by a sudden change in the time constant applied in the feedforward control of the tightening force of the lockup clutch.

In order to achieve the above object, this invention provides a lockup control device for a lockup clutch of a torque converter for a vehicle. The torque converter comprises a pump impeller connected to an engine and a turbine runner connected to an automatic transmission, and transmits a torque between the pump impeller and the turbine runner via a fluid and the lockup clutch according to a tightening force of the lockup clutch. The device comprises a mechanism which regulates the tightening force, a sensor which detects a rotation speed of the pump impeller, a sensor which detects a rotation speed of the turbine runner, a sensor which detects a running condition of the engine, and a programmable controller that controls the mechanism.

The controller is programmed to calculate a real relative rotation speed of the pump impeller and the turbine runner from the rotation speed of the pump impeller and the rotation speed of the turbine runner, determine a target relative rotation speed based on the running condition of the engine, perform feedback control of the mechanism based on a difference between the target relative rotation speed and the real relative rotation speed to cause the difference to decrease, perform feedforward control of the mechanism in combination with the feedback control, determine whether or not a variation in a feedforward control amount applied to the mechanism by the feedforward control has exceeded a predetermined value, and correct a feedback control amount applied to the mechanism by the feedback control in a direction to moderate an effect of the variation, when the variation has exceeded the predetermined value.

This invention also provide a lockup control method of the lockup clutch of a torque converter for a vehicle. The torque converter comprises a pump impeller connected to an engine and a turbine runner connected to an automatic transmission, and transmits a torque between the pump impeller and the turbine runner via a fluid and via the lockup clutch according to a tightening force of the lockup clutch supplied from a tightening force regulating mechanism.

The method comprises determining a rotation speed of the pump impeller, the rotation speed of the pump impeller being equal to an engine rotation speed, determining a rotation speed of the turbine runner, determining a running condition of the engine, calculating a real relative rotation speed of the pump impeller and the turbine runner from the rotation speed of the pump impeller and the rotation speed of the turbine runner, determining a target relative rotation speed based on the running condition of the engine, performing feedback control of the regulating mechanism based on a difference between the target relative rotation speed and the real relative rotation speed to cause the difference to decrease, performing feedforward control of the regulating mechanism in combination with the feedback control, determining whether or not a variation in a feedforward control amount applied to the mechanism by the feedforward control has exceeded a predetermined value, and correcting a feedback control amount applied to the regulating mechanism by the feedback control in a direction to moderate an effect of the variation, when the variation has exceeded the predetermined value.

The details as well as other features and advantages of this invention are set forth in the remainder of the specification and are shown in the accompanying drawings.

BRIEF DESCRIPTION OF THE DRAWINGS

FIGS. 15A–15F are similar to FIGS. 12A–12F, but show a prior art example.

DESCRIPTION OF THE PREFERRED EMBODIMENTS

Figure 1:
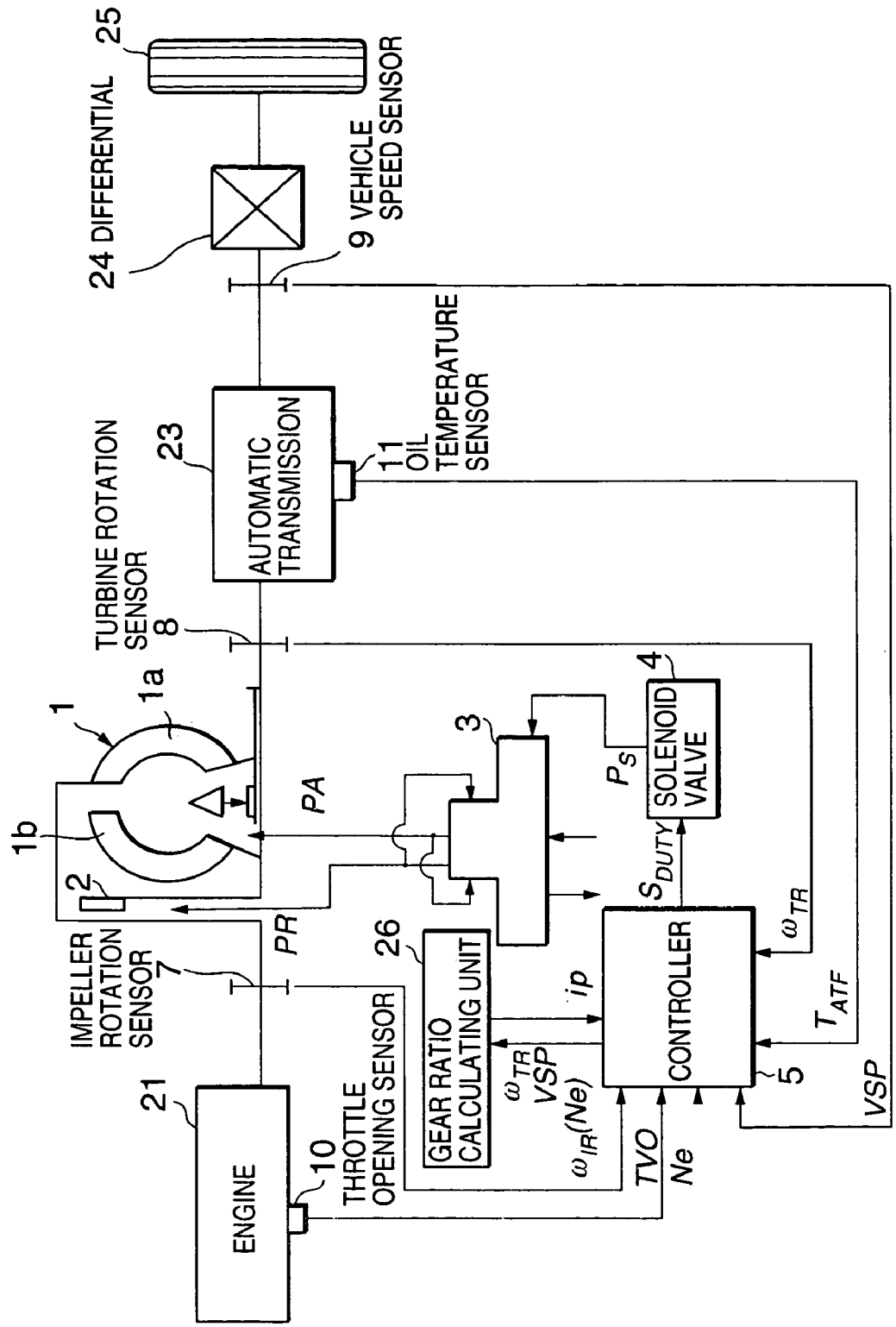
FIG. 1 is a schematic diagram of a power train of a vehicle provided with a lockup clutch to which this invention is applied.

Referring to FIG. 1 of the drawings, a multi-cylinder engine 21 for a vehicle is connected to an automatic transmission 23 via a torque converter 1, and an output torque of the automatic transmission 23 is transmitted to a driving wheel 25 via a differential 24. The automatic transmission 23 is constituted by a continuously variable transmission.

The torque converter 1 is provided with a pump impeller 1a driven by the engine 21, a turbine runner 1b joined to the input shaft of the automatic transmission 23, and a lockup clutch 2 which directly connects the pump impeller 1a and turbine runner 1b.

The tightening force of the lockup clutch 2 is determined by a differential pressure (PA–PR) between an application pressure PA and a release pressure PR.

When the application pressure PA is lower than the release pressure PR, the lockup clutch 2 enters an unlocked state, and the pump impeller 1a and turbine runner 1b rotate according to the torque transmission function of the fluid interposed therebetween.

When the application pressure PA is higher than the release pressure PR, the lockup clutch 2 is tightened by a tightening force depending on the differential pressure (PA–PR).

When the differential pressure (PA–PR) is small, the pump impeller 1a and turbine runner 1b transmit a torque according to the differential pressure (PA–PR) while performing relative rotation.

When the differential pressure (PA–PR) becomes larger than a preset value, the pump impeller 1a and turbine runner 1b enter a direct connection state without relative rotation, i.e., a lockup state.

In the state which does not result in a lockup where relative rotation is possible, the torque converter 1 delivers torque by two pathways, i.e., by the fluid and by mechanical transmission by the lockup clutch 2. The engine output torque is equal to the total torque.

Therefore, if the fluid transmission torque is subtracted from the engine output torque, the torque transmitted via the lockup clutch 2 can be calculated. The transmission torque of the lockup clutch 2 is hereinafter expressed as the torque capacity of the lockup clutch 2.

The torque capacity of the lockup clutch 2 is controlled by a control device comprising a slip control valve 3, a solenoid valve 4, a controller 5 and a gear ratio calculation unit 26.

Figure 2:
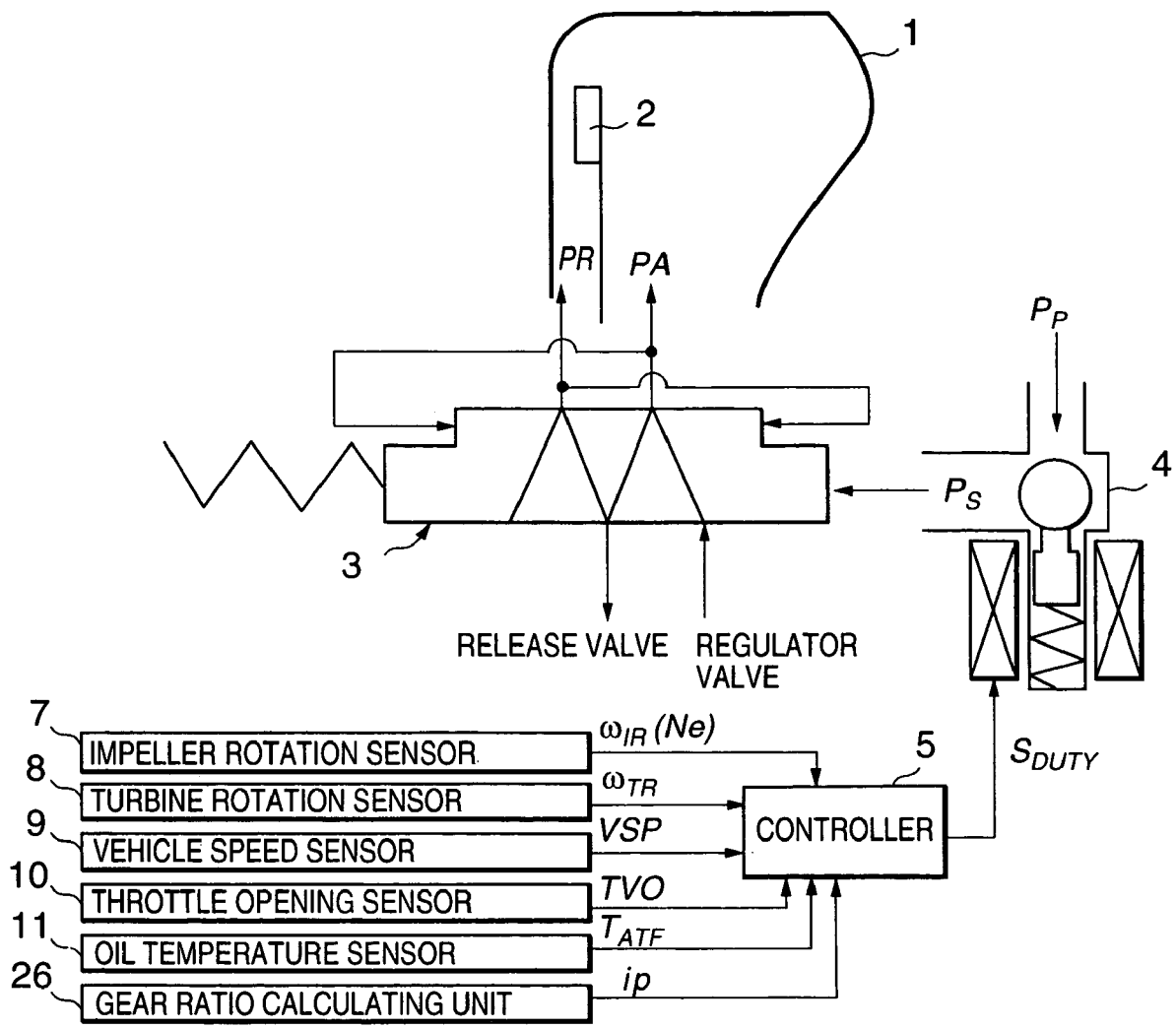
FIG. 2 is a schematic diagram of a lockup control device according to this invention.

Referring to FIG. 2, the control valve 3 supplies the application pressure PA and release pressure PR to the lockup clutch 2 according to a signal pressure Ps input from the solenoid valve 4. The control valve 3 varies the pressure difference between the application pressure PA and release pressure PR, i.e., the tightening pressure of the lockup clutch 2 according to the signal pressure Ps.

The solenoid valve 4 adjusts the pump pressure Pp supplied from the oil pressure source to the signal pressure Ps using a solenoid which responds to a duty signal $S_{DUTY}$. The duty signal $S_{DUTY}$ is outputted from the controller 5.

The controller 5 comprises a microcomputer provided with a central processing unit (CPU), read-only memory (ROM), random access memory (RAM) and input/output interface (I/O interface). The controller may also comprise plural microcomputers.

The controller 5 controls the differential pressure (PA–PR) applied to the lockup clutch 2 according to whether the running state of the vehicle corresponds to a converter region, a slip region or a lockup region. In the first half of the slip region, open loop control of the differential pressure (PA–PR) is performed, and in the second half of the slip region, feedback/feedforward control of the differential pressure (PA–PR) is performed. The controller 5 controls the differential pressure (PA–PR) by outputting of the duty signal $S_{DUTY}$ to the solenoid valve 4.

To generate the duty signal $S_{DUTY}$, signals from a throttle opening sensor 10 which detects a throttle opening TVO of the engine 21, an impeller rotation sensor 7 which detects a rotation speed $\omega_{IR}$ of the pump impeller 1a, a turbine rotation sensor 8 which detects a rotation speed $\omega_{TR}$ of the turbine runner 1b, an oil temperature sensor 11 which detects an oil temperature $T_{ATF}$ of the automatic transmission 23, a vehicle speed sensor 9 which detects a vehicle speed VSP respectively, and a signal which shows a calculation result from a gear ratio calculation unit 26 are input into the controller 5. Since the pump impeller 1a is directly connected to the engine 21, the rotation speed $\omega_{IR}$ of the pump impeller 1a is also used as a rotation speed Ne of the engine 21.

The gear ratio calculation unit 26 calculates a real gear ratio ip of the automatic transmission 23 from the rotation speed $\omega_{TR}$ of the turbine runner 1b and the vehicle speed VSP, and inputs it to the controller 5. The gear ratio calculation unit 26 comprises the same microcomputer as that of the controller 5. The controller 5 and the gear ratio calculation unit 26 may also comprise the same microcomputer.

Figure 3:
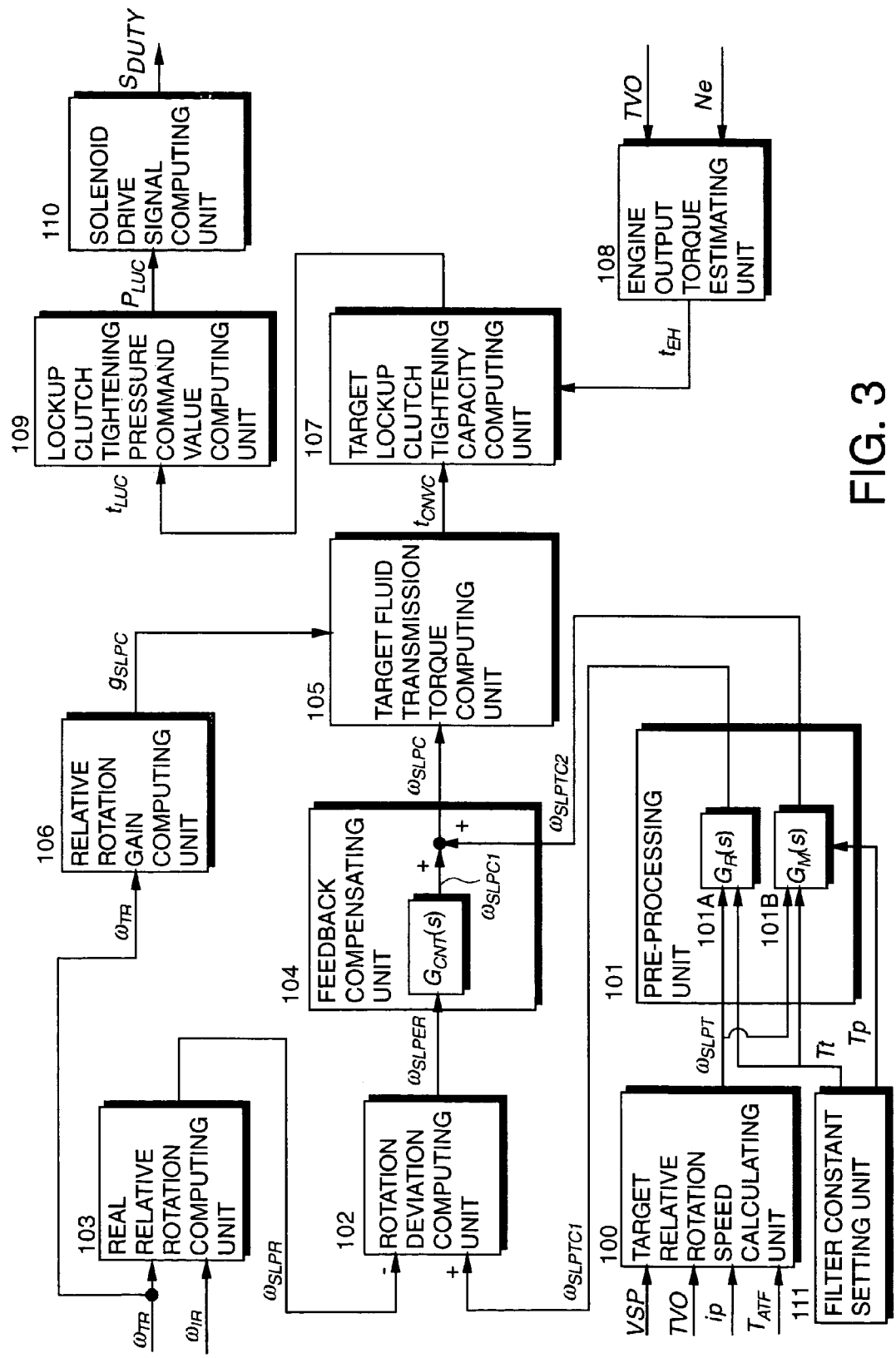
FIG. 3 is a block diagram describing control functions of a controller according to this invention.

Next, referring to FIG. 3, the function of the controller 5 to feedback/feedforward control the differential pressure (PA−PR) will be described. All the blocks shown in the figure are virtual units for the purpose of describing the functions of the controller 5, and do not exist as physical entities.

A target relative rotation speed calculating unit 100 determines a target relative rotation speed $\omega_{SLPT}$ of the pump impeller 1a and turbine runner 1b based on the vehicle speed VSP, throttle opening TVO, gear ratio ip and oil temperature $T_{ATF}$. The target relative rotation speed $\omega_{SLPT}$ is the relative rotation speed for obtaining a minimum fluctuation in the engine output torque due to scatter in the combustion of the engine 21 and a minimum pulsation noise emitted by the drive train. The target relative rotation speed $\omega_{SLPT}$ is preset by experiment according to the above parameters.

A real relative rotation computing unit 103 computes a real relative rotation speed $\omega_{SLPR}$ of the torque converter 1 by subtracting the rotation speed $\omega_{TR}$ of the turbine runner 1b from the rotation speed $\omega_{IR}$ of the pump impeller 1a. Herein, the rotation speed of the pump impeller 1a is equivalent to the rotation speed of the engine 21 and the rotation speed of the turbine runner 1b is equivalent to the input rotation speed of the automatic transmission 23.

A pre-processing unit 101 calculates target relative rotation speed correction values $\omega_{SLPTC1}$ and $\omega_{SLPTC2}$ by processing the target relative rotation speed $\omega_{SLPT}$ with compensation filters so that the target relative rotation speed displays the intended response.

The pre-processing unit 101 comprises a pre-processing compensator 101A and a feedforward compensator 101B. The pre-processing compensator 101A calculates a first target relative rotation speed correction value $\omega_{SLPTC1}$ from Equation (1) below.

$$\omega_{SLPTC1} = G_R(s) \cdot \omega_{SLPT}(t) \text{ where} \tag{1}$$

$G_R(s)$ = transfer function of reference model = $\dfrac{1}{1 + Tt \cdot s}$, $Tt$ = time constant, and $s$ = differential operator.

Equation (1) corresponds to a first-order delay processing.

The feedforward compensator 101B calculates a second target relative rotation speed correction value $\omega_{SLPTC2}$ front Equation (2) below.

$$\omega_{SLPTC2} = G_M(s) \cdot \omega_{SLPT}(t) \text{ where} \tag{2}$$

$G_M(s) = \dfrac{G_R(s)}{P(s)}$, $G_M(s)$ = transfer function of feedforward compensator, and $P(s)$ = transfer function with respect to relative rotation model $= \dfrac{1}{1 + Tp \cdot s}$, and $Tp$ = time constant.

Providing that the time constant Tp is a first-order constant, the transfer function $G_M(S)$ of the feedforward compensator can be expressed by Equation (3) below.

$$G_M(s) = \dfrac{1 + Tp \cdot s}{1 + Tt \cdot s} \tag{3}$$

A filter constant setting unit 111 sets the time constant Tp and the time constant Tt. The control system according to this invention is a two-degree-of-freedom control system, so the time constant Tt of the reference model is set according to the running state of the vehicle such that preferred response is realized, and the time constant Tp of the relative rotation model is set according to the characteristic of the relative rotation model.

A rotation deviation computing unit 102 calculates the deviation $\omega_{SLPR}$ between the first target relative rotation speed $\omega_{SLPTC1}$ and the real relative rotation speed $\omega_{SLPR}$ as follows.

$$\omega_{SLPR} = \omega_{SLPTC1} - \omega_{SLPR} \tag{4}$$

A feedback compensating unit 104 comprises a feedback compensator that calculates a first relative rotation speed command value $\omega_{SLPC1}$ on the basis of this deviation $\omega_{SLPER}$ using Equation (5) below which represents proportional/integral feedback control.

$$\omega_{SLPC1} = G_{CNT}(s) \cdot \omega_{SLPER} = K_P \cdot \omega_{SLPER} + \dfrac{K_i}{s} \cdot \omega_{SLPER} \text{ where} \tag{5}$$

$G_{CNT}(s)$ = transfer function of feedback compensator, $K_P$ = proportional gain, $K_i$ = integral gain, and $s$ = differential operator.

In addition, the feedback compensating unit 104 calculates a relative rotation speed command value $\omega_{SLPC}$ by adding the second target relative rotation speed correction value $\omega_{SLPTC2}$ to the first relative rotation speed command value $\omega_{SLPC1}$ in Equation (6) below.

$$\omega_{SLPC} = \omega_{SLPC1} + \omega_{SLPTC2} \tag{6}$$

Figure 6:
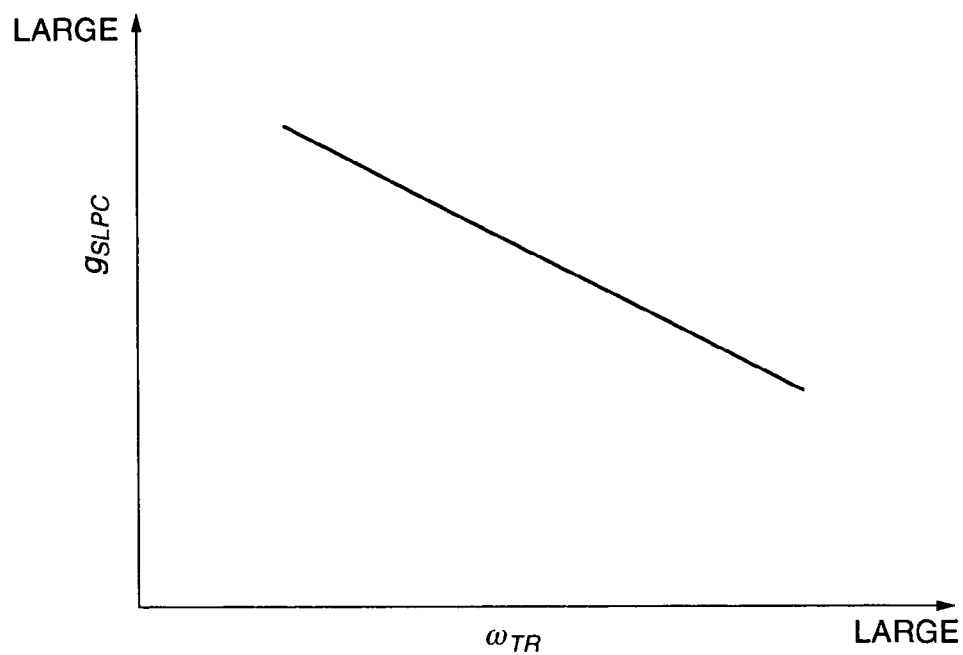
FIG. 6 is a diagram showing the characteristics of a map of a relative rotation gain $g_{SLPC}$, which is stored by the controller.

A relative rotation gain computing unit 106 uses the rotation speed $\omega_{TR}$ of the turbine runner 1b to calculate the relative rotation gain $g_{SLPC}$ by referring to a map having the characteristics shown in FIG. 6. This map is prestored in the memory (ROM) of the controller 5.

A target fluid transmission torque computing unit 105 calculates a target converter transmission torque $t_{CNVC}$ corresponding to the relative rotation speed command value $\omega_{SLPC}$ using the relative rotation gain $g_{SLPC}$ using Equation (7) below.

$$t_{CNVC} = \frac{\omega_{SLPC}}{g_{SLPC}} \quad (7)$$

Figure 7:
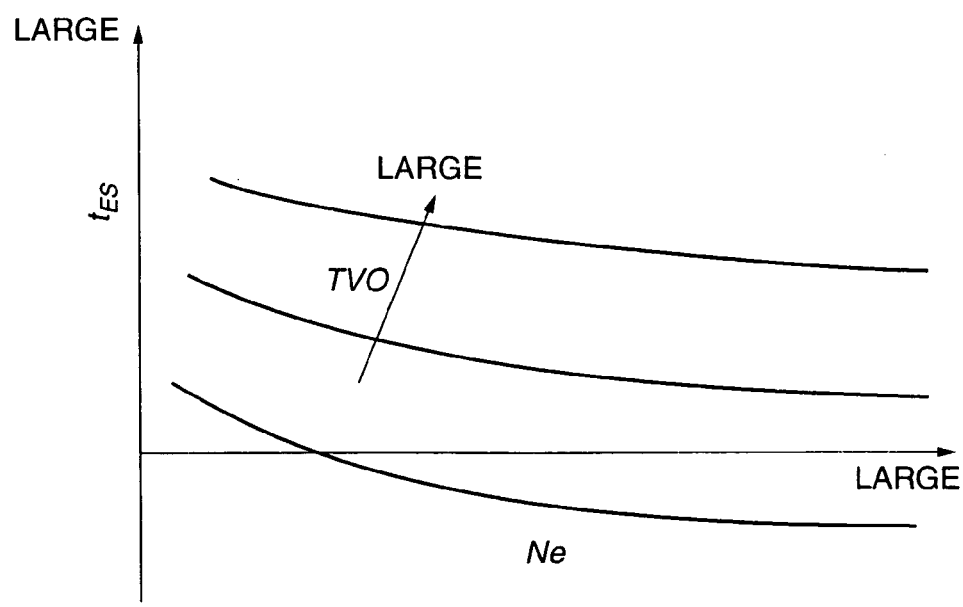
FIG. 7 is a diagram showing the characteristics of a map of an engine output torque $t_{ESC}$, which is stored by the controller.

An engine output torque estimating unit 108 estimates an engine output torque $t_{ES}$ of the engine 21 by referring to a map having the characteristics shown in FIG. 7 based on the engine rotation speed Ne and throttle opening TVO. This map is prestored in the memory (ROM) of the controller 5.

This value is filter processed by Equation (8) below using a time constant $T_{ED}$ taking account of a first-order delay of the engine dynamics to obtain an engine torque estimated value $t_{EH}$.

$$t_{EH} = \frac{1}{1 + T_{ED} \cdot s} \cdot t_{ES} \quad (8)$$

A target lockup clutch tightening capacity computing unit 107 computes a target lockup clutch tightening capacity $t_{LU}$ by subtracting the target fluid transmission torque $t_{CNVC}$ in Equation (7) from the engine output torque estimated value $t_{EH}$ obtained as described above $$t_{LU} = t_{EH} - t_{CNVC} \quad (9)$$

Figure 8:
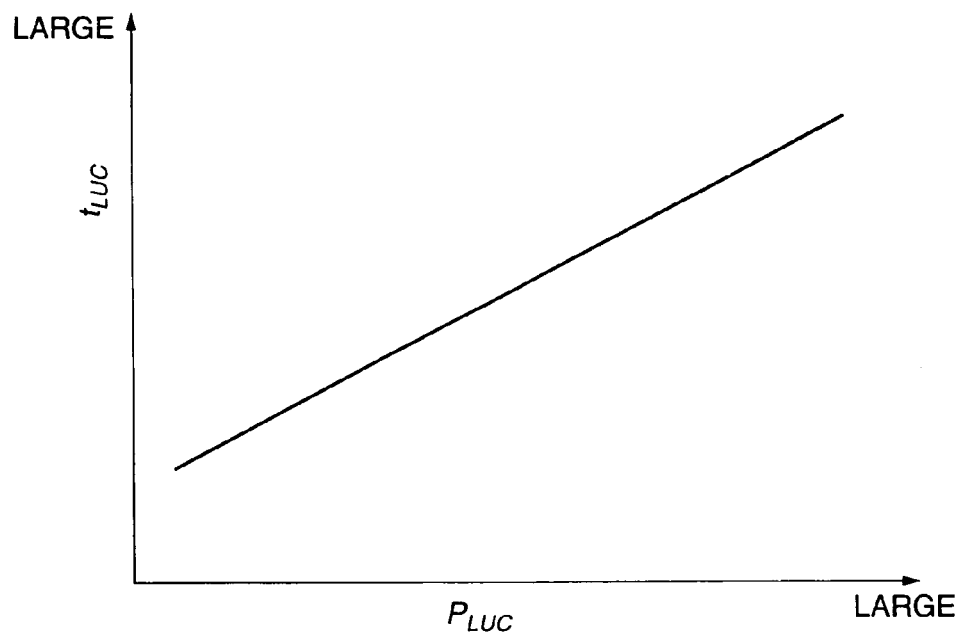
FIG. 8 is a diagram showing the characteristics of a map of a target lockup clutch tightening capacity $t_{LUC}$, which is stored by the controller.

A lockup clutch tightening pressure command value computing unit 109 calculates a lockup clutch tightening pressure command value $P_{LUC}$ required to achieve the target lockup clutch tightening capacity $t_{LUC}$ by referring to a map having the characteristics shown in FIG. 8. This map is drawn up in advance on the basis of experimental results regarding the relation between the tightening pressure and tightening capacity of the lockup clutch 2, and is prestored in the memory (ROM) of the controller 5.

A solenoid drive signal computing unit 110 calculates a lockup duty based on the lockup clutch tightening pressure command value $P_{LUC}$, and outputs a corresponding duty signal $S_{DUTY}$ to the solenoid valve 4

Next referring to FIG. 4, a routine for correcting the first relative rotation speed command value $\omega_{SLPC1}$ will be described.

This routine is executed by the controller 5 at intervals of ten milliseconds when the engine 21 is operating.

Figure 4:
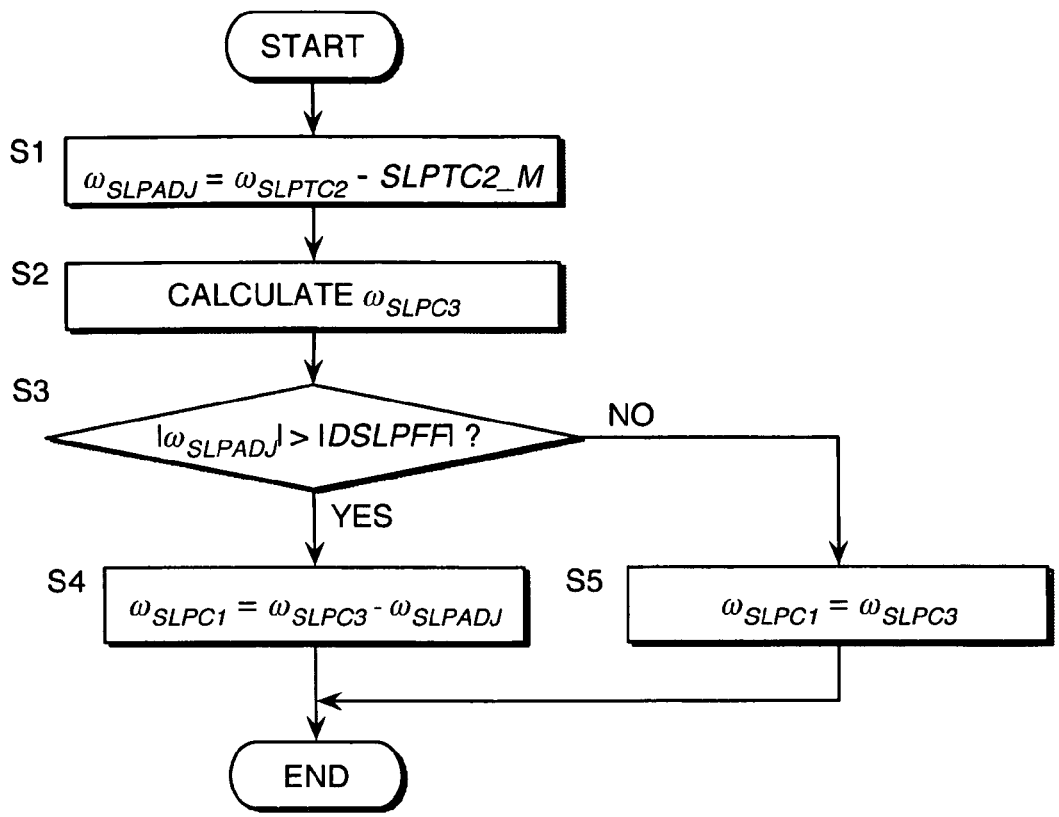
FIG. 4 is a flowchart describing a routine for correcting an output $\omega_{SLPC1}$ of a feedback compensator performed by the controller.

Referring first to FIG. 4, in a first step S1, the controller 5 calculates a variation $\omega_{SLPADJ}$ using Equation (10) below.

$$\omega_{SLPADJ} = \omega_{SLPTC2} - SLPTC2\_M \quad (10)$$

where SLPTC2_M=second target relative rotation speed correction value $\omega_{SLPTC2}$ that was calculated by the feedforward compensator 101B of the pre-processing unit 101 on the immediately preceding occasion when the routine was performed.

In a next step S2, the controller 5 calculates the first relative rotation speed command value $\omega_{SLPC1}$ using the function of the feedback compensator in the feedback compensating unit 104, i.e., calculating $\omega_{SLPC1}$ from the deviation $\omega_{SLPER}$ using Equation (5). Since the value calculated in this step may be further corrected later, the value is memorized as a candidate value $\omega_{SLPC3}$.

Figure 5:
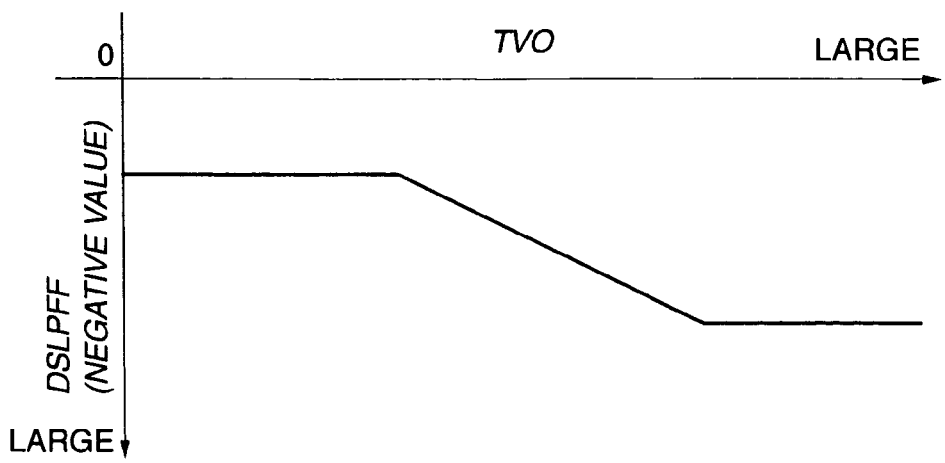
FIG. 5 is a diagram showing the characteristics of a map of a predetermined threshold value DSPFF, which is stored by the controller.

In a next step S3, the controller compares an absolute value of the variation $\omega_{SLPADJ}$ with that of a predetermined threshold value DSLPFF. Herein the threshold value DSLPFF is a value for determining if the output $\omega_{SLPTC2}$ of the feedforward compensator 101B will cause the lockup clutch 2 to generate a shock. The predetermined threshold value DSPFF varies according to the throttle valve opening TVO as shown in FIG. 5. The controller 5 prestores a map defining the relation as shown in the figure and, in the step S2, it refers to the map from the throttle valve opening TVO to determine the predetermined value DSPFF.

During the tightening process of the lockup clutch 2, the variation $\omega_{SLPADJ}$ takes a negative value. The value DSPFF in FIG. 5 also takes a negative value. The comparison in the step S2 is performed using absolute values in order to compare the magnitude of the variation $\omega_{SLPADJ}$ and the magnitude of the predetermined value DSPFF.

When the magnitude of the variation $\omega_{SLPADJ}$ is greater than that of the threshold value DSPFF, it is considered that the variation in the output $\omega_{SLPTC2}$ of the feedforward compensator 101B will generate a shock. In this case, the controller 5 performs the processing of a step S4.

When the magnitude of the variation $\omega_{SLPADJ}$ is not greater than the threshold value DSPFF, it is considered that the shock generated by the variation in the output $\omega_{SLPTC2}$ of the feedforward compensator 101B is negligible small. In this case, the controller 5 performs the processing of a step S5.

In the step S4, the controller 5 calculates the first relative rotation speed command value $\omega_{SLPC1}$ using Equation (11) below.

$$\omega_{SLPC1} = \omega_{SLPC3} - \omega_{SLPADJ} \quad (11)$$

In the step S5, the controller 5 sets the first relative rotation speed command value $\omega_{SLPC1}$ to equal the candidate value $\omega_{SLPC3}$ calculated in the step S3.

After the processing of the step S4 or step S5, the controller 5 terminates the routine.

According to the execution of this routine, a large variation in the output $\omega_{SLPTC2}$ of the feedforward compensator 101B is always compensated by the output $\omega_{SLPC1}$ of the feedback compensator in the feedback compensating unit 104 and abrupt change in the lockup clutch tightening pressure is thereby prevented.

Referring to FIGS. 9-11 and FIGS. 12A–12F, 13A–13F, 14A–14F, a second embodiment of this invention will be described.

In this embodiment, different values T1 and T2 are selectively applied for the time constant Tt of the reference model. In order to obtain a good response in the lockup operation of the lockup clutch 2, the time constant Tt is preferably changed over from T1 to T2, which is smaller than T1. As can be understood from Equations (2) and (3), when the time constant Tt varies in a stepwise fashion, the output $\omega_{SLPTC2}$ of the feedforward compensator 101B varies in a similar fashion.

In this embodiment, it is assumed that switching over of the time constant Tt between the values T1 and T2 causes the output $\omega_{SLPTC2}$ of the feedforward compensator 101B to vary beyond the magnitude of the threshold value DSPFF.

Accordingly, the controller 5 corrects the output $\omega_{SLPC1}$ of the feedback compensator in the feedback compensating unit 104 when the time constant Tt has been switched over from the value T1 to the value T2, or vice versa.

Figure 10:
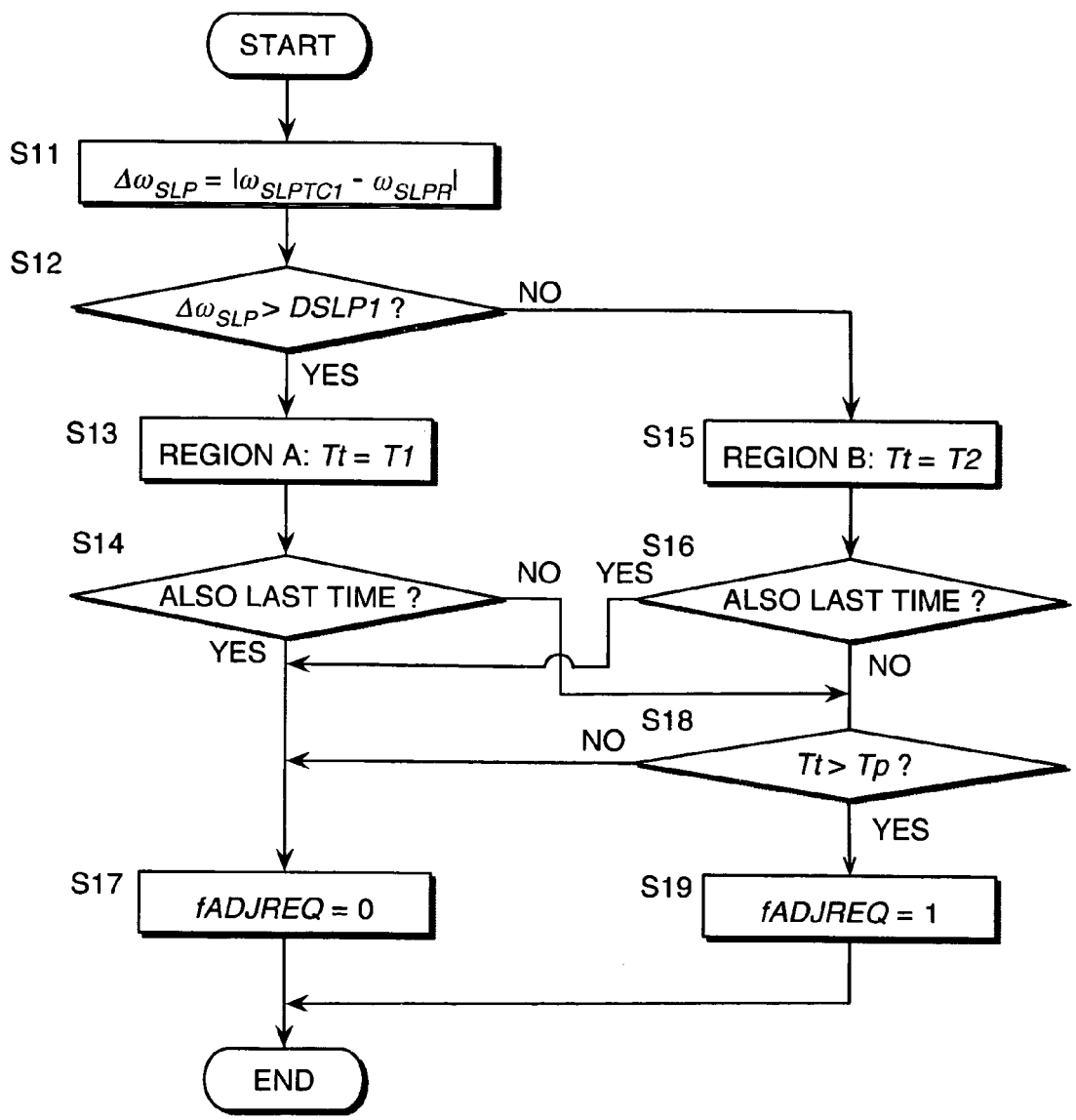
FIG. 10 is a flowchart describing a routine for setting a correction request flag fADJREQ performed a the controller according to the second embodiment of this invention.

A routine shown in FIG. 10 determines whether or not correction of the output $\omega_{SLPC1}$ of the feedback compensator in the feedback compensating unit 104 is required. A routine shown in FIG. 11 corrects the output $\omega_{SLPC1}$ of the feedback compensator according to the determination result of the routine of FIG. 10.

The routines are executed consecutively by the feedback compensating unit 104 in the controller 5 at intervals of ten milliseconds when the engine 21 is operating.

Referring to FIG. 10, in a first step S11, the controller 5 calculates a deviation $\Delta\omega_{SLP}$ between the target relative rotation speed $\omega_{SLPT}$ determined by the target relative rotation speed calculating unit 100 and the real relative rotation speed $\omega_{SLPR}$ computed by the real relative rotation computing unit 103 according to Equation (12) below.

$$\Delta\omega_{SLP} = |\omega_{SLPTC1} - \omega_{SLPR}| \tag{12}$$

Figure 9:
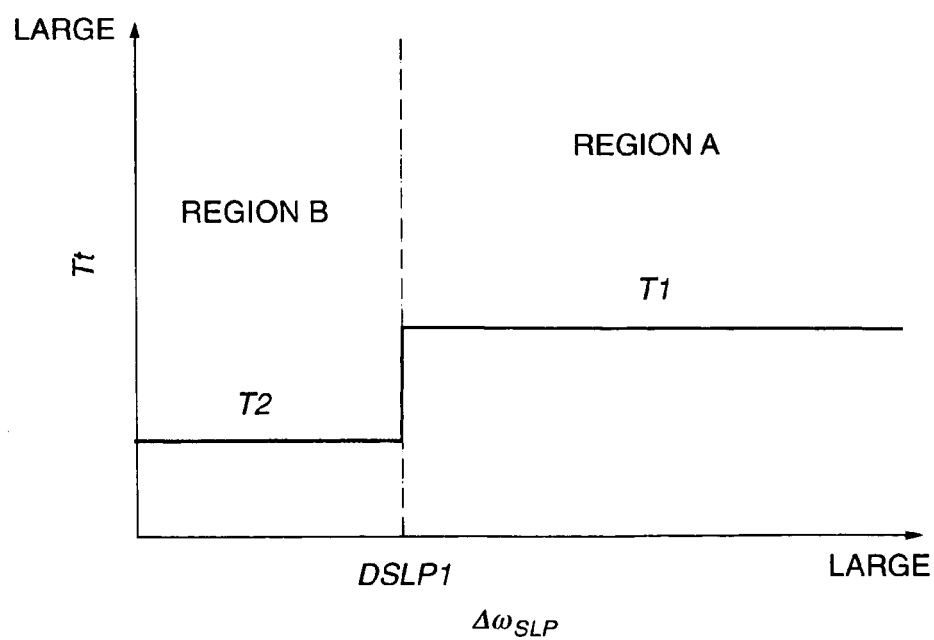
FIG. 9 is a diagram showing the characteristics of a time constant Tt applied in the calculation of an output $\omega_{SLPTC2}$ of a feedforward compensator according to a second embodiment of this invention.

In a next step S12, the controller 5 compares the deviation $\Delta\omega_{SLP}$ with a predetermined value DSLP1. Referring to FIG. 9, the predetermined value DSLP1 is a value for determining which of the values T1 or T2 be applied for the time constant Tt of the reference model according to the magnitude of the deviation $\Delta\omega_{SLP}$. When the deviation $\Delta\omega_{SLP}$ is greater than the predetermined value DSLP1, the controller 5 sets the time constant Tt of the reference model to the larger value T1 in a step S13. Herein, the deviation region where $\Delta\omega_{SLP}$ is greater than the predetermined value DSLP1 is named as region A.

When the deviation $\Delta\omega_{SLP}$ is not greater than the predetermined value DSLP1, the controller 5 sets the time constant Tt of the reference model to the smaller value T2 in a step S15. Herein, the deviation region where $\Delta\omega_{SLP}$ is not greater than the predetermined value DSLP1 is named as region B.

After the processing of the step S13, the controller 5 determines in a step S14 whether or not the deviation $\Delta\omega_{SLP(n-1)}$ calculated on the immediately preceding occasion when the routine was executed was also a value in the region A.

Similarly, after the processing of the step S15, the controller 5 determines in a step S16 whether or not the deviation $\Delta\omega_{SLP(n-1)}$ calculated on the immediately preceding occasion when the routine was executed was also a value in the region B If the determination in the step S14 or S16 is affirmative, in a step S17, the controller 5 resets a correction request flag fADJREQ to zero.

If the determination in the step S14 or S16 is negative, the controller 5 determines whether or not the time constant Tt of the reference model is greater than the time constant Tp of the relative rotation model in a step S18. When the time constant Tt is not greater than the time constant Tp, the controller 5 performs the processing of the step S17, i.e., resetting the correction request flag fADJREQ to zero. After the processing in the step S17, the controller 5 terminates the routine.

When the time constant Tt is greater than the time constant Tp in the step S18, the controller 5 sets the correction request flag fADJREQ to unity in a step S19. After the processing in the step S19, the controller 5 terminates the routine.

To summarize the above, only when the deviation $\Delta\omega_{SLP}$ has shifted from the region A to the region B, or vice versa and the time constant Tt of the reference model is greater than the time constant Tp of the relative rotation model, is the correction request flag fADJREQ set to unity.

Figure 11:
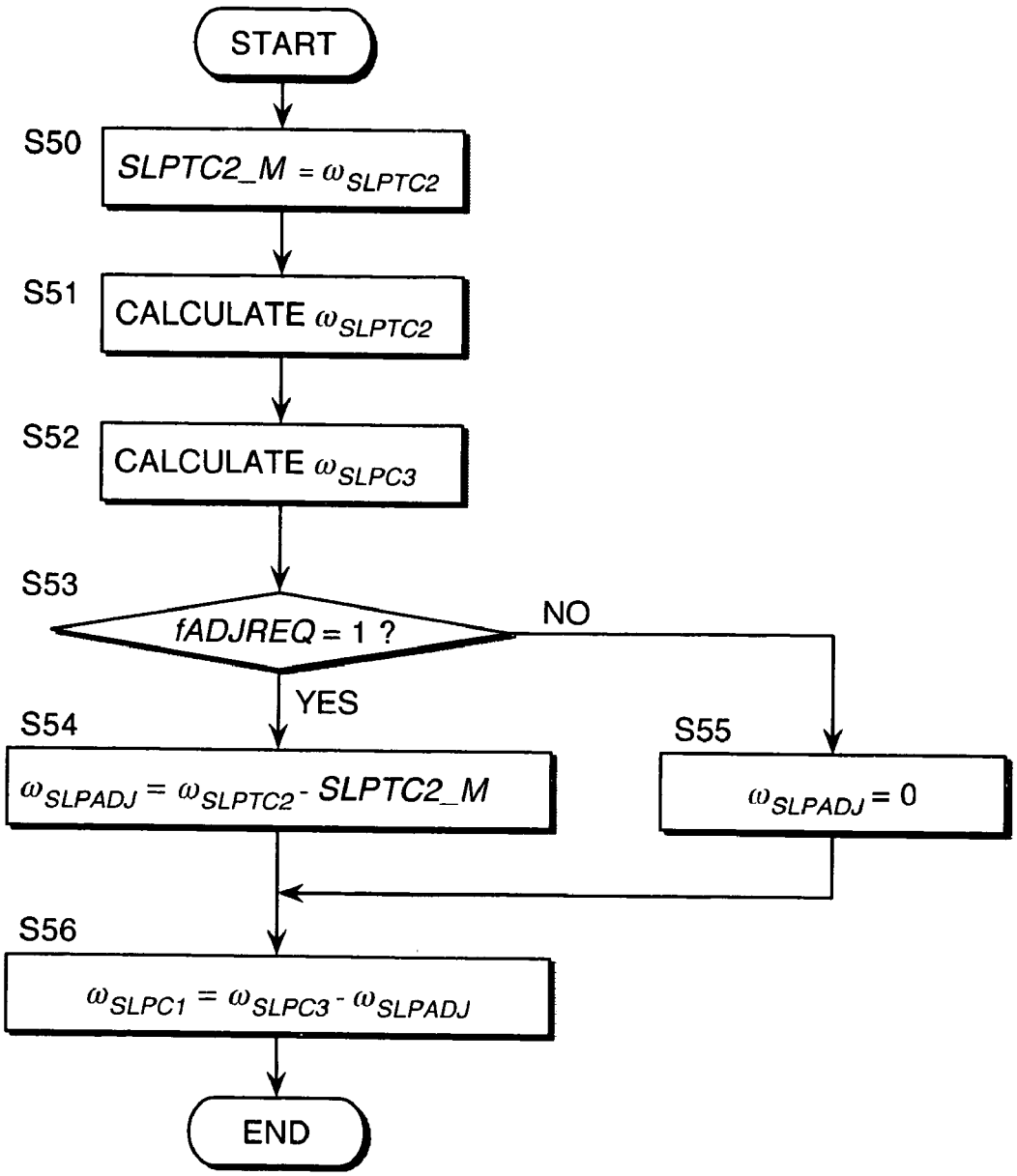
FIG. 11 is a flowchart describing a routine for calculating an output $\omega_{SLPC1}$ of a feedback compensator performed by the controller according to the second embodiment of this invention.

Next, referring to FIG. 11, the routine for correcting the output $\omega_{SLPC1}$ of the feedback compensator in the feedback compensating unit 104 will be described.

First in a step S50, the controller 5 reads the second target relative rotation speed correction value $\omega_{SLPTC2}$ that was calculated by the feedforward compensator 101B of the pre-processing unit 101 on the immediately preceding occasion when the routine was performed, and memorizes it as a memorized value SLPTC2_M.

In a next step S51, the controller 5 reads the current target relative speed correction value $\omega_{SLPTC2}$ that was calculated by the feedforward compensator 101B of the pre-processing unit 101 on the present occasion when the routine was performed.

In a next step S52, the controller 5 calculates the first relative rotation speed command value $\omega_{SLPC1}$ using the function of the feedback compensator in the feedback compensating unit 104, i.e., calculating $\omega_{SLPC1}$ from the deviation $\omega_{SLPER}$ using Equation (5). Since the value calculated in this step may be further corrected later, the value is memorized as a candidate value $\omega_{SLPC3}$.

In a next step S53, the controller 5 determines whether or not the correction request flag fADJREQ is at unity.

When the correction request flag fADJREQ is at unity, the controller 5, in a step S54, determines to correct the candidate value $\omega_{SLPC3}$ before outputting it as the first relative rotation speed command value $\omega_{SLPC1}$ from the feedback compensator in the feedback compensating unit 104, and sets a correction amount to equal the variation $\omega_{SLPADJ}$, which is calculated using Equation (10) described with reference to the first embodiment.

When the correction request flag fADJREQ is not at unity, i.e., zero, the controller 5 determines not to apply correction to the candidate value $\omega_{SLPC3}$ and sets the correction amount $\omega_{SLPADJ}$ to zero in a step S55.

After the processing of the step S54 or S55, the controller 5 calculates the first relative rotation speed command value $\omega_{SLPC1}$ in a step S56 using Equation (13) below.

$$\omega_{SLPC1} = \omega_{SLPC3} - \omega_{SLPADJ} \tag{13}$$

When the second target relative rotation speed correction value $\omega_{SLPTC2}$ decreases, the correction amount $\omega_{SLPADJ}$ takes a negative value and an increase correction of the first relative rotation speed command value $\omega_{SLPC1}$ is performed in the step S56.

After the calculation of the first relative rotation speed command value $\omega_{SLPC1}$, the controller 5 terminates the routine.

Next referring to FIGS. 12A–12F, the result of an execution of the routines in FIGS. 10 and 11 will be described.

Herein, control of the lockup clutch tightening pressure is started at a time t0 such that the real relative rotation speed $\omega_{SLPR}$ converges towards the target relative rotation speed $\omega_{SLPT}$.

Figure 12A:
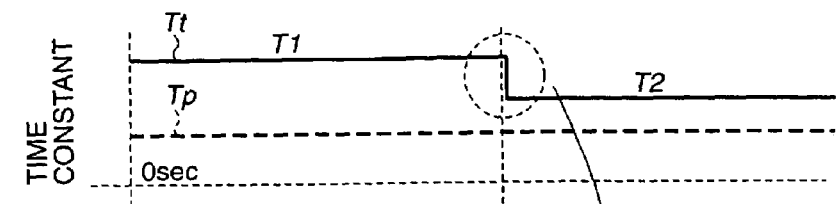
FIGS. 12A–12F are timing charts showing the result of an execution of the routines of FIGS. 10 and 11 by the controller according to the second embodiment of this invention.
Figure 12B:
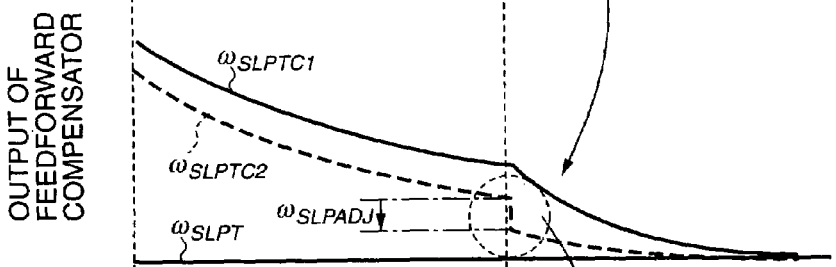
Figure 12C:
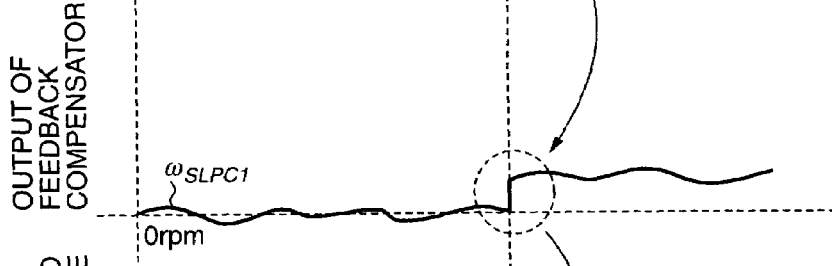
Figure 12D:
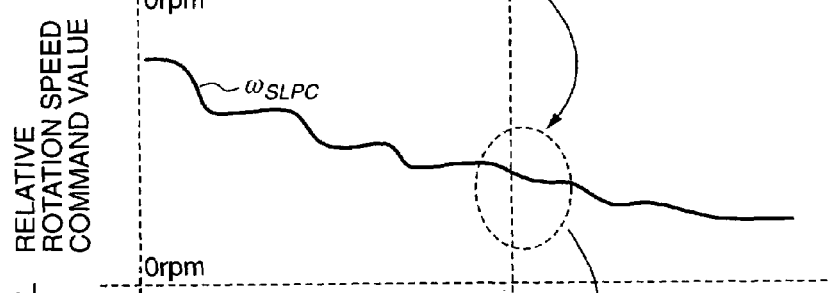
Figure 12E:
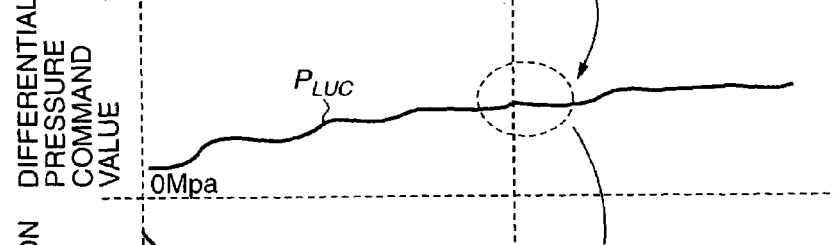
Figure 12F:
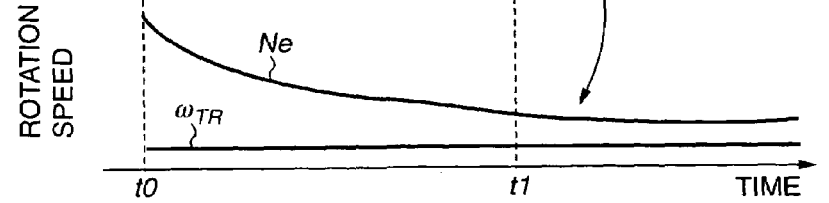

The lockup clutch tightening pressure command value $P_{LUC}$ shown in FIG. 12E varies according to the relative rotation speed command value $\omega_{SLPC}$ shown in FIG. 12D. The relative rotation speed command value $\omega_{SLPC}$ is a sum of the output $\omega_{SLPTC2}$ of the feedforward compensator 101B and the output $\omega_{SLPC1}$ of the feedback compensator in the feedback compensating unit 104.

In order to obtain a preferable response in the lockup operation of the lockup clutch 2, when the deviation $\Delta\omega_{SLP}$ becomes not larger than the predetermined value DSLP1 at a time t1, the time constant Tt for the feedforward compensator 101B is changed over from T1 to T2, which is smaller than T1 as shown in FIG. 12A. As a result, the output $\omega_{SLPTC2}$ of the feedforward compensator 101B is abruptly decreased as shown in FIG. 12B.

When the routine in FIG. 10 is performed immediately after the time t1, the determination results in the step S16 and the step S18 are both negative, so the correction request flag fADJREQ is set to unity in the step S19. When the routine in FIG. 11 is performed consecutively, therefore, the processing in the step S54 is performed and an increase correction of the output $\omega_{SLPC1}$ of the feedback compensator is performed in the step S56. Herein the increment in the output $\omega_{SLPC1}$ of the feedback compensator is equal to the decrement $\omega_{SLPADJ}$ in the output $\omega_{SLPTC2}$ of the feedforward compensator 101B as shown in FIGS. 12B and 12C.

As a result, the relative rotation speed command value $\omega_{SLPC}$ that is the sum of $\omega_{SLPTC2}$ and $\omega_{SLPC1}$, as well as the lockup clutch tightening pressure command value $P_{LUC}$, do not show any steep variation despite the change-over of the time constant Tt as shown in FIG. 12D and FIG. 12E respectively. Hence no shock occurs when the change-over of the time constant Tt is performed, while ensuring prompt convergence of the real relative rotation speed $\omega_{SLPR}$ with the target relative rotation speed $\omega_{SLPT}$.

The same result may be obtained without correcting the output $\omega_{SLPC1}$ of the feedback compensator, by causing the output $\omega_{SLPTC2}$ of the feedforward compensator 101B to vary smoothly. However, in order to vary the output $\omega_{SLPTC2}$ smoothly, the time constant Tt must be varied smoothly according to the time constant Tp, which makes the control device much more complicated than the device according to this embodiment.

FIGS. 15A–15F show a prior art case where no correction of the output $\omega_{SLPC1}$ of the feedback compensator is performed when the time constant Tt is changed over from T1 to T2.

Since there is no correction at the time t1 when the $\omega_{SLPTC2}$ is abruptly decreased as shown in FIG. 15B, the same variation appears in the relative rotation speed command value $\omega_{SLPC}$, and the lockup clutch tightening pressure command value $P_{LUC}$ suddenly increases. Due to this sudden increase in the lockup clutch tightening pressure, a fluctuation occurs in the output rotation speed of the lockup clutch 2 as shown in FIG. 15F, possibly causing a driver or passenger of the vehicle to feel a shock or an uncomfortable feeling.

Next, referring to FIGS. 13A–13F and FIGS. 14A–14F, the effect of the processing of the step S18 in the routine in FIG. 10 will be described.

Figure 13A:
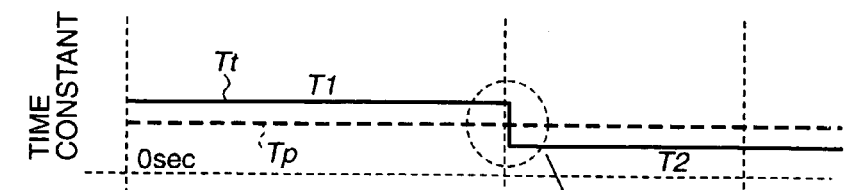
FIGS. 13A–13F are similar to FIGS. 12A–12F, but show a case where a step S18 is omitted from the routine of FIG. 10.
Figure 13B:
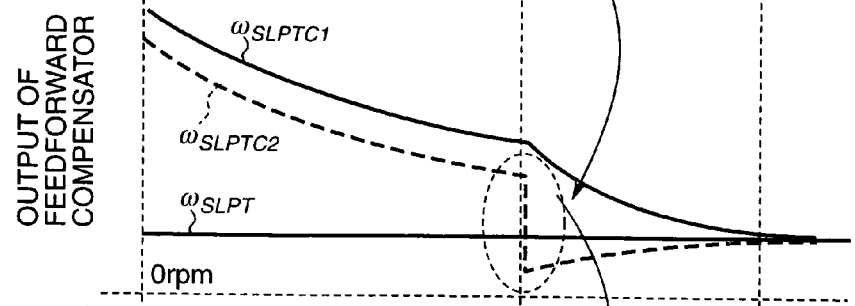
Figure 13C:
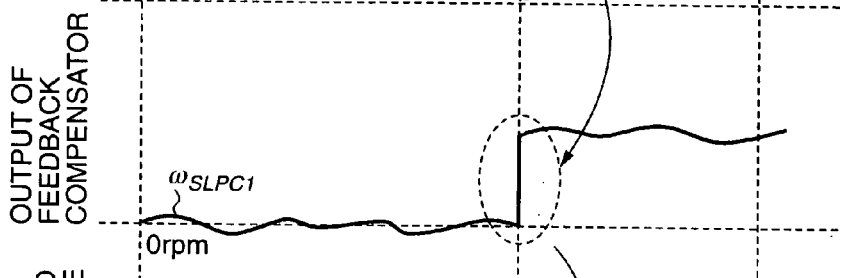
Figure 13D:
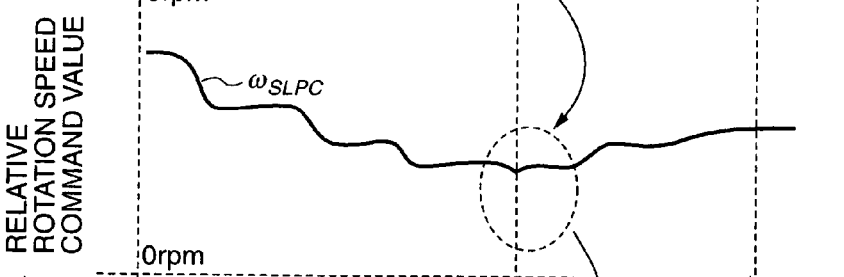
Figure 13E:
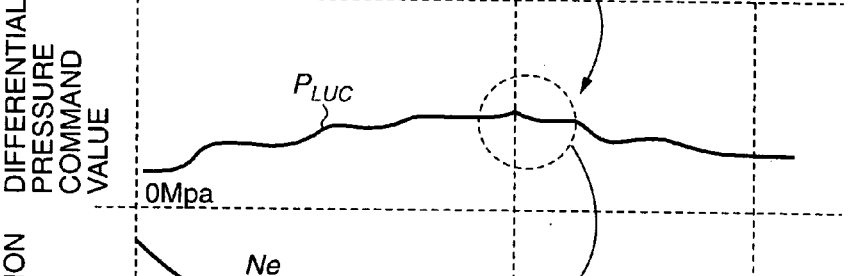
Figure 13F:
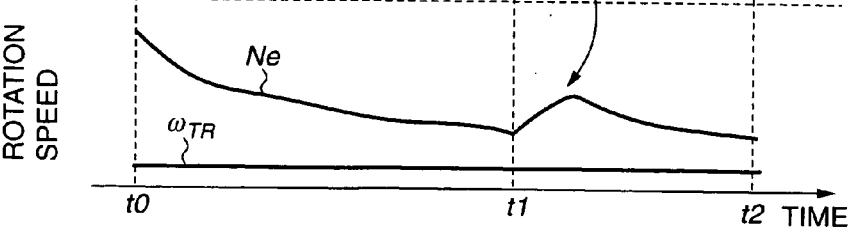
Figure 14A:
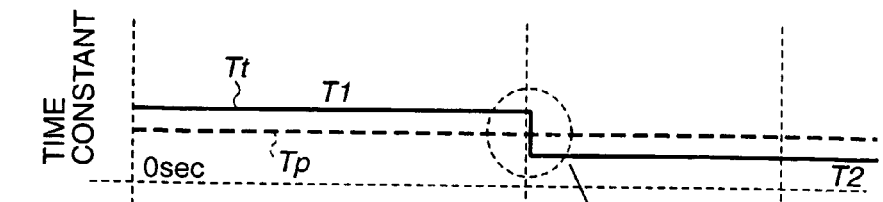
FIGS. 14A–14F are similar to FIGS. 12A–12F, but show a specific effect of the execution of the step S18 in the routine of FIG. 10.
Figure 14B:
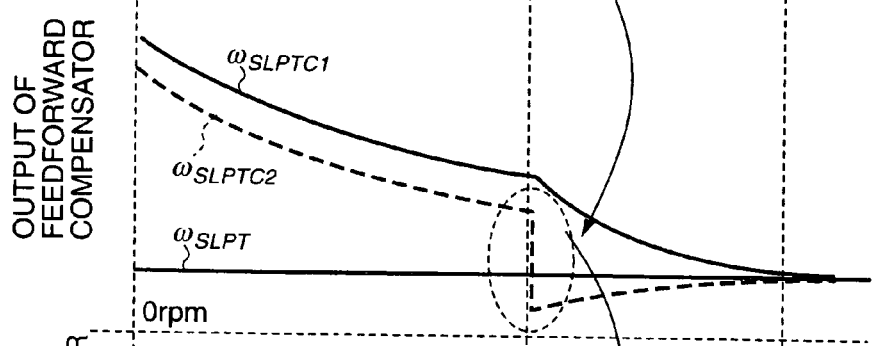
Figure 14C:
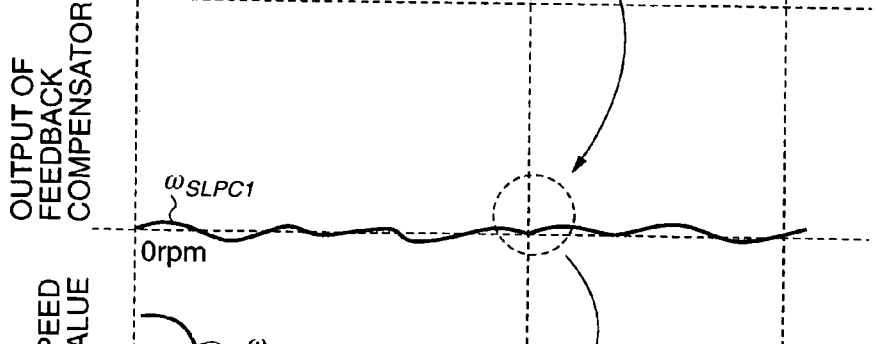
Figure 14D:
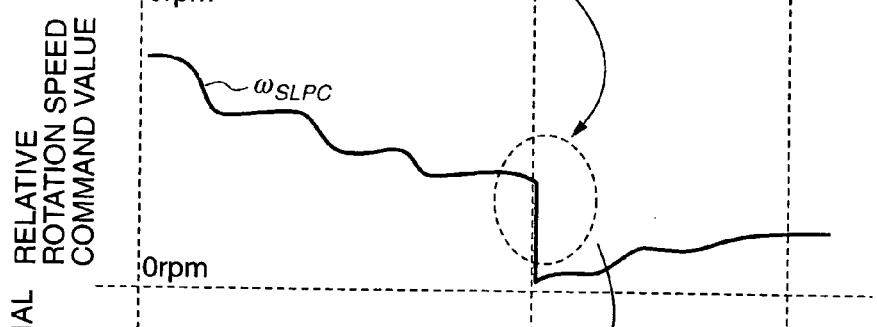
Figure 14E:
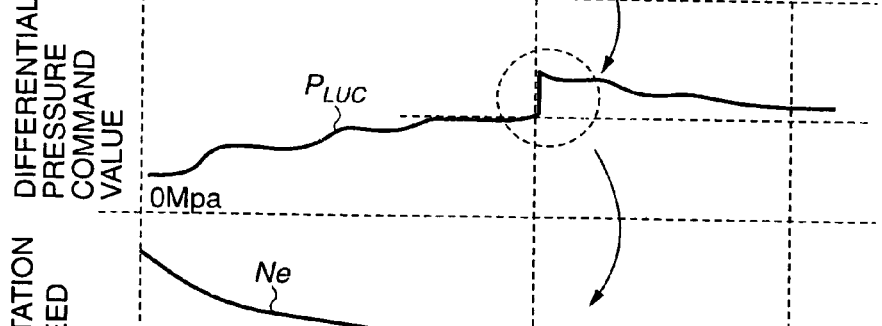

The timing charts shown in FIGS. 13A–13F and FIGS. 14A–14F show a case where control of lockup clutch tightening pressure is performed as in the case of FIGS. 12A–12F, but unlike the case of FIGS. 12A–12F, the value T2 for the time constant Tt is herein set smaller than the time constant Tp as shown in FIGS. 13A and 14A. In this case, the feedforward compensator 101B performs an advance control.

Even when the value T2 is set smaller than the time constant Tp, by applying a correction to the output $\omega_{SLPC1}$ of the feedback compensator, a sharp decrease in the output $\omega_{SLPTC2}$ of the feedforward compensator 101B at the time t1 is compensated as shown in FIGS. 13B–13D, and abrupt change in the lockup clutch tightening pressure is suppressed as shown in FIG. 13E. However, in this case, as the output $\omega_{SLPTC2}$ of the feedforward compensator 101B increases during the period from t1 to t2, the relative rotation speed command value $\omega_{SLPC}$ also increases during this period as shown in FIG. 13D. As a result, as shown in FIG. 13E, the lockup clutch tightening pressure command value decreases after the time t1, and prompt convergence of the real relative rotation speed $\omega_{SLPR}$ with the target relative rotation speed $\omega_{SLPT}$ cannot be expected.

In order to avoid such an adverse effect, this invention prevents the correction from being applied to the output $\omega_{SLPC1}$ of the feedback compensator in the feedback compensating unit 104 on the condition that the value T2 be smaller than the time constant Tp. This is accomplished by the step S18 in FIG. 10. When the time constant Tt is not greater than the time constant Tp in the step S18, the correction request flag fADJREQ is set to zero in the step S17, and therefore the correction amount $\omega_{SLPADJ}$ is set to zero in the step S55 such that the correction of the output $\omega_{SLPC}$ of the feedback compensator is not performed in the step S56.

Referring to FIGS. 14A–14F, at a time t1, when the time constant Tt is over from T1 to T2, the correction of the output $\omega_{SLPC}$ of the feedback compensator is not performed because the time constant Tt has become smaller than the time constant Tp.

Figure 14F:
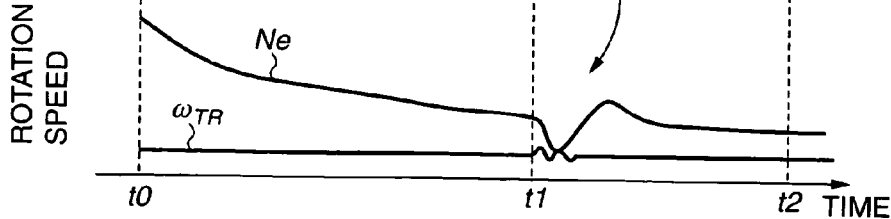

In this case, a sudden increase in the lockup clutch tightening pressure command value $P_{LUC}$ appears at the time t1 and a fluctuation occurs in the output rotation speed of the lockup clutch 2 as shown in FIG. 14F as in the prior art case of FIGS. 15A–15F, but a prompt convergence of the real relative rotation speed $\omega_{SLPR}$ with the target relative rotation speed $\omega_{SLPT}$ is ensured by not applying correction to the output $\omega_{SLPC}$ of the feedback compensator.

The contents of Tokugan 2003-407800, with a filing date of Dec. 5, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, according to the embodiments described above, the reference model is constituted by a first-order delay system, and a denominator and a numerator of the transfer function of the feedforward compensator 101B are both first-order functions. This invention can however be applied to a compensating system with a transfer function of a higher order, because the gist of this invention is to prevent variation in the output of the feedforward compensator from adversely affecting the lockup clutch tightening pressure and the objective device is not limited by the number of order of the transfer function.

According to the embodiments described above, the parameters required for control are detected using sensors, but this invention can be applied to any device which can perform the claimed control using the claimed parameters regardless of how the parameters are acquired. Further, in the above embodiment, the controller 5 is constituted by a single microcomputer, but may be constituted by plural microcomputers.

What is claimed is:

1. A lockup control device for a lockup clutch of a torque converter for a vehicle, the torque converter comprising a pump impeller connected to an engine and a turbine runner connected to an automatic transmission, and transmitting a torque between the pump impeller and the turbine runner via a fluid and the lockup clutch according to a tightening force of the lockup clutch, the device comprising:
   a mechanism which regulates the tightening force;
   a sensor which detects a rotation speed of the pump impeller;

a sensor which detects a rotation speed of the turbine runner;

a sensor which detects a running condition of the engine; and a programmable controller programmed to:

calculate a real relative rotation speed of the pump impeller and the turbine runner from the rotation speed of the pump impeller and the rotation speed of the turbine runner;

determine a target relative rotation speed based on the running condition of the engine;

perform feedback control of the mechanism based on a difference between the target relative rotation speed and the real relative rotation speed to cause the difference to decrease;

perform feedforward control of the mechanism in combination with the feedback control;

determine whether or not a variation in a feedforward control amount applied to the mechanism by the feedforward control has exceeded a predetermined value; and correct a feedback control amount applied to the mechanism by the feedback control in a direction to moderate an effect of the variation when the variation has exceeded the predetermined value.

2. The lockup control device as defined in claim 1, wherein a correction amount of the feedback control amount is set to be equivalent to the variation.

3. The lockup control device as defined in claim 1, wherein the feedforward control is a two-degree-of-freedom control applying a time constant Tt of a reference model that is preset such that a preferred response is realized, and a time constant Tp of a relative rotation model that is preset according to a characteristic of the lockup clutch.

4. The lockup control device as defined in claim 3, wherein the time constant Tt of the reference model is set to a first value when the difference is greater than a predetermined value, and to a second value smaller than the first value when the difference is not greater than the predetermined value.

5. The lockup control device as defined in claim 4, wherein a difference between the first value and the second value is set to cause the variation to exceed the predetermined value, and the controller is further programmed to correct the feedback control amount applied to the mechanism when the time constant Tt of the reference model is changed over between the first value and the second value.

6. The lockup control device as defined in claim 5, wherein the controller is further programmed not to correct the feedback control amount when the time constant Tt of the reference model is smaller than the time constant Tp of the relative rotation model.

7. The lockup control device as defined in claim 5, wherein the controller is further programmed not to correct the feedback control amount when the feedforward control is performing advance control of the mechanism.

8. A lockup control device for a lockup clutch of a torque converter for a vehicle, the torque converter comprising a pump impeller connected to an engine and a turbine runner connected to an automatic transmission, and transmitting a torque between the pump impeller and the turbine runner via a fluid and the lockup clutch according to a tightening force of the lockup clutch, the device comprising:

means for regulating the tightening force;

means for detecting a rotation speed of the pump impeller;

means for detecting a rotation speed of the turbine runner;

means for detecting a running condition of the engine;

means for calculating a real relative rotation speed of the pump impeller and the turbine runner from the rotation speed of the pump impeller and the rotation speed of the turbine runner;

means for determining a target relative rotation speed based on the running condition of the engine;

means for performing feedback control of the regulating means based on a difference between the target relative rotation speed and the real relative rotation speed to cause the difference to decrease;

means for performing feedforward control of the regulating means in combination with the feedback control;

means for determining whether or not a variation in a feedforward control amount applied to the regulating means by the feedforward control has exceeded a predetermined value; and means for correcting a feedback control amount applied to the regulating means by the feedback control in a direction to moderate an effect of the variation, when the variation has exceeded the predetermined value.

9. A lockup control method for a lockup clutch of a torque converter for a vehicle, the torque converter comprising a pump impeller connected to an engine and a turbine runner connected to an automatic transmission, and transmitting a torque between the pump impeller and the turbine runner via a fluid and via the lockup clutch according to a tightening force of the lockup clutch supplied from a tightening force regulating mechanism, the method comprising:

determining a rotation speed of the pump impeller;

determining a rotation speed of the turbine runner;

determining a running condition of the engine;

calculating a real relative rotation speed of the pump impeller and the turbine runner from the rotation speed of the pump impeller and the rotation speed of the turbine runner;

determining a target relative rotation speed based on the running condition of the engine;

performing feedback control of the regulating mechanism based on a difference between the target relative rotation speed and the real relative rotation speed to cause the difference to decrease;

performing feedforward control of the regulating mechanism in combination with the feedback control;

determining whether or not a variation in a feedforward control amount applied to the mechanism by the feedforward control has exceeded a predetermined value; and correcting a feedback control amount applied to the regulating mechanism by the feedback control in a direction to moderate an effect of the variation, when the variation has exceeded the predetermined value.

* * * * *